United States Patent
Ault et al.

(10) Patent No.: US 8,407,703 B1
(45) Date of Patent: Mar. 26, 2013

(54) QUIENSCE TERMINATION/SUSPENSION IN A MULTITHREADED ENVIROMENT

(75) Inventors: Donald Fred Ault, Hyde Park, NY (US); Ernest Scott Bender, Saugerties, NY (US); Jon Kevin Franks, Saugerties, NY (US); John Arthur Helmbold, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/733,997

(22) Filed: Oct. 29, 1996

Related U.S. Application Data (63) Continuation of application No. 08/603,403, filed on Feb. 20, 1996, now abandoned, which is a continuation of application No. 08/187,675, filed on Jan. 27, 1994.

(51) Int. Cl.
*G06F 9/44* (2006.01)
(52) U.S. Cl. .................................. 718/100; 718/107
(58) Field of Classification Search .................. 718/100, 718/107
See application file for complete search history.

(56) References Cited

U.S. PATENT DOCUMENTS

| | | | | |
|---|---|---|---|---|
| 5,012,409 A * | 4/1991 | Fletcher et al. | 364/200 |
| 5,179,702 A * | 1/1993 | Spix et al. | 718/102 |
| 5,247,675 A * | 9/1993 | Farrell et al. | 718/103 |
| 5,297,274 A * | 3/1994 | Jackson | 395/500 |
| 5,305,455 A * | 4/1994 | Anschuetz et al. | 395/700 |
| 5,319,782 A * | 6/1994 | Goldberg et al. | 395/650 |
| 5,355,484 A * | 10/1994 | Record et al. | 717/127 |
| 5,404,521 A * | 4/1995 | Murray | 395/650 |
| 5,428,789 A * | 6/1995 | Waldron, III | 718/103 |
| 5,519,867 A * | 5/1996 | Moeller et al. | 718/107 |

FOREIGN PATENT DOCUMENTS

JP 5-127927 5/1993

OTHER PUBLICATIONS

Performance of Multi-Thread Execution in a Shared-Memory Multi-Processor, Proceeding of The Third IEEE Symposium on Parallel and Distributed Processing; IEEE Comp. Soc. Press, Los Alamots, CA, USA.*
Miller et al. "Breakpoints and Halting in Distributed Programs", 1988 IEEE, pp. 316-323.*
IBM Technical Disclosure Buelletin, vol. 36, No. 10, Oct. 1993, "Cross-Address Space Control Function", D. Ault, S. Bendez, M. Essenmache D, J. V. Franks.*
IBM Technical Disclosure Bulletin, vol. 35, No. 6, Nov. 1992, Interoperability Between MVS and Posix Functions D.F. Ault.*
IBM Technical Disclosure Bulletin, vol. 35, No. 6, Nov. 1992, "Form Clone Address Space Tamplementation on MVS".*
"Modern Operating Systems", by Andrew S. Tanenbaum, Vuje Universiteit, Amsterdam, The Netherland, Prentic Hall, 1992.*
"Introducing Open Edition MVS", International Business Machines Corporation 1993, By Walt Whitman.*

(Continued)

*Primary Examiner* — Van Nguyen
(74) *Attorney, Agent, or Firm* — William A. Kinnaman, Jr.

(57) ABSTRACT

In response to the detection of an external event by the first thread, the first thread sends a quiesce event to each additional thread of the application and suspends execution. The quiesce event may be either a suspension event requesting suspension of the additional threads or a termination event requesting termination of the additional threads. Each additional thread, upon receiving the quiesce event, checks its environment to determine whether it is holding any critical system resource. If the additional thread determines that is not holding any critical system resource and that it is therefore safe to quiesce, the additional thread quiesces. Before quiescing, the last additional thread to quiesce resumes the first thread, which is now free to perform critical operations without interference from the additional threads. If the quiesce type is suspension, the first thread resumes the additional threads upon completing its critical operations, whereupon the application resumes its normal operation.

11 Claims, 9 Drawing Sheets

OTHER PUBLICATIONS

IBM MVS/ESA Support for IEEE POSIX Standards, Technical Presentation Guide, Document No. GG24-3867-00 Dec. 1992.*

Ault et al., "Cross-Address Space Control Function", *IBM Technical Disclosure Bulletin*, vol. 36, No. 10, Oct. 1993, pp. 591-595.

Ault, "Interoperability Between MVS and Posix Functions", *IBM Technical Disclosure Bulletin*, vol. 35, No. 6, Nov. 1992, pp. 383-388.

Ault, "Fork Clone Address Space Implementation on MVS", *IBM Technical Disclosure Bulletin*, vol. 35, No. 6, Nov. 1992, pp. 363-367.

Tannenbaum, "Process and Processors in Distributed Systems", *Modern Operating Systems*, 1992, pp. 507-523.

"Introducing OpenEdition MVS", IBM Publication GC23-3010-00, Feb. 1993.

"MVS/ESA Support for IEEE POSIX Standards Technical Presentation Guide", IBM Publication No. GG24-3867-00, 1993.

* cited by examiner

QUIENSCE TERMINATION/SUSPENSION IN A MULTITHREADED ENVIROMENT

This application is a continuation of application Ser. No. 08/603,403, filed Feb. 20, 1996 now abandoned, which is a continuation of application Ser. No. 08/187,675, filed Jan. 27, 1994.

BACKGROUND OF THE INVENTION

1. Field of the Invention

This invention relates to a method of coordinating the quiescing (i.e., termination or suspension) of the various threads of a multithreaded process.

2. Description of the Related Art

Computer operating systems—the software that interfaces between user applications and the hardware and performs the basic supervisory functions in a computer system—are well known in the art. Many modern operating systems allow for the use of multiple threads within a process, or application. A multithreaded application is defined as a program using more than one thread of control to perform its work. (The terms "process" and "application" are used interchangeably in this specification to refer to one or more threads sharing a common address space.) A. S. Tanenbaum, *Modern Operating Systems*, (1992), incorporated herein by reference, describes several modern operating systems generally, as well as threads in particular at pp. 507-23.

A particular example of an operating system supporting multithreaded applications is the IBM MVS/ESA operating system with its recently introduced OpenEdition MVS extension. The OpenEdition MVS extension allows applications written to the IEEE POSIX 1003.1, 1003.2 and 1003.4a (draft) standards to run on a hardware-software platform made up of an IBM System/390 computer and the MVS/ESA operating system. (IBM, OpenEdition, MVS/ESA and System/390 are trademarks of IBM Corporation.) Further information on the OpenEdition MVS extension may be found in the following publications, which are incorporated herein by reference:

Ault, "Fork Clone Address Space Implementation on MVS", *IBM Technical Disclosure Bulletin*, vol. 35, no. 6, pp. 363-67 (November 1992);

Ault, "Interoperability Between MVS and POSIX Functions", *IBM Technical Disclosure Bulletin*, vol. 35, no. 6, pp. 383-88 (November 1992);

Ault et al., "Cross-Address Space Control Function", *IBM Technical Disclosure Bulletin*, vol. 36, no. 10, pp. 591-95 (October 1993);

*Introducing OpenEdition MVS*, IBM Publication No. GC23-3010-00 (1993);

*MVS/ESA Support for IEEE POSIX Standards: Technical Presentation Guide*, IBM Publication No. GG24-3867-00 (1993).

As noted above, the OpenEdition MVS extension of the MVS/ESA operating system allows for the use of multiple threads within a process. In MVS terms, a thread can be thought of as a task. Multiple threads thus equate to the use of multiple MVS tasks within an MVS address space.

Although multithreaded applications are advantageous in many situations, lack of adequate task control in a multitasking (i.e., multithreaded) address space causes problems in termination, debugging and dumping. Thus, the POSIX standard calls for the termination of all threads within a process if any one of those threads terminates abnormally. This can be accomplished in MVS by abending the job step task or by using CallRTM to abend the appropriate tasks. Many problems are encountered however, when these types of asynchronous abends are sent to the MVS tasks that were supporting OpenEdition MVS threads.

One problem that occurs is that the run-time library cannot serialize its cleanup of common process resources when the threads of the process are taken down in this abrupt, random manner. Another is that many components do not have sufficient error recovery to handle being abended between any two instructions. In some cases these deficiencies can have catastrophic results, destruction of the file system, to name one. Although the abend error recovery procedure might be improved, it would be preferable to avoid this type of abending altogether.

The desire to suspend the remaining threads of a multithreaded application in a controlled manner may arise in a debugging context. When debugging a multithreaded application, it would be desirable to allow a user debugging such an application to choose which threads run and which threads are suspended for any particular event and to be able to change the run/suspend status dynamically. This suspension process also should be of a sort that neither changes the flow of the application nor allows any thread to hold a critical system-managed resource at the time of suspension.

Another context in which the desire to suspend the remaining threads of a multithreaded application may arise is when obtaining a dump of the process with information captured from all of the threads. The desire here is similar to that in the debugging situation described above. The task requesting the dump should be able to suspend the execution of all the other tasks such that the other tasks do not hold any critical system resources that would prevent the calling task from taking the dump. After the dump is taken, the dumping task must resume execution of the other tasks.

Thus, lack of adequate task control in a multitasking address space causes problems in termination, debugging and dumping. What is desired is a mechanism for terminating or suspending execution of tasks in a multithreaded environment in a predictable and nondestructive fashion.

SUMMARY OF THE INVENTION

The above problems are resolved by creating a new quiesce function that when invoked sends a quiesce event to all other threads (i.e., tasks) in the address space. The thread invoking the quiesce function then waits until all the events are acted upon and the target threads are placed into the desired state.

To accomplish this, a registration function is provided that allows a user to make known, to the operating system, the quiesce exit routine that is to be given control upon receipt of a quiesce event. If no exit is specified then the operating system determines when the event is handled.

The method of delivery of the event is a service request block/interruption response block (SRB/IRB) combination that interrupts the target thread's execution. From here various checks can be made on the request block (RB) that was running at the time of the interrupt to see if it is safe to act upon the quiesce event. These checks include making sure that the environment is acceptable for giving control to the quiesce exit; one does not want to interrupt a system service, for instance. If control is given to the quiesce exit and it determines that the quiesce event can be acted on, the appropriate action is taken. If the quiesce event was for termination then the exit terminates the thread. If the quiesce event was to suspend then the exit issues the appropriate suspension service.

If the system IRB or the user's quiesce exit determines that the quiesce event cannot be acted on, then the event is left pending and delivered again upon exit of the next system service or even sooner if the user detects that it has reached a safe point to act on the quiesce event.

The delivery of the quiesce event is carried out on all of the threads until the last thread has entered the desired state. The last thread doing so posts (i.e., resumes) the invoker of the quiesce function.

The advantage of this solution lies in allowing the decision of when the quiesce state is to be entered up to the thread being affected. The problem of unconditionally stopping a thread while holding a critical resource is avoided. Also avoided is the destructive results of asynchronously abending a thread executing in an "unstable" or "critical" section of code.

DESCRIPTION OF THE PREFERRED EMBODIMENT

Figure 1:
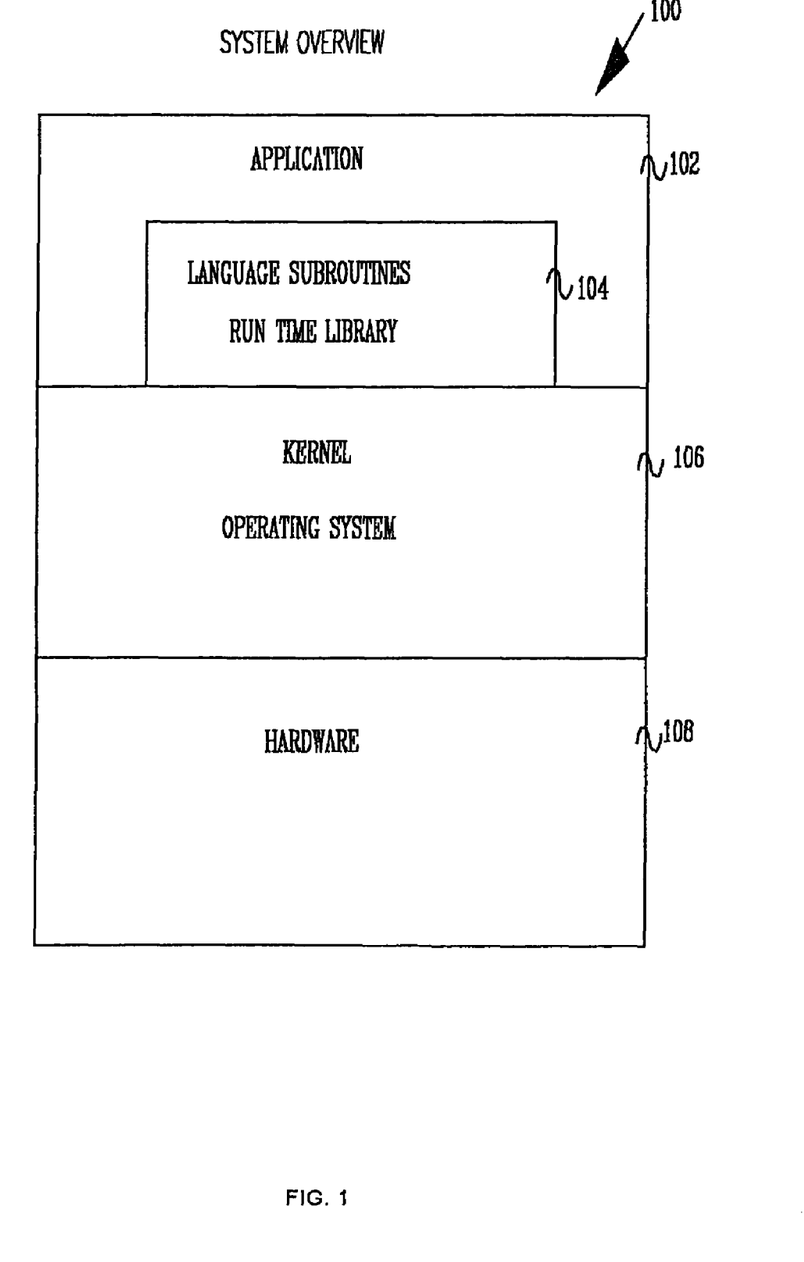
FIG. 1 is a schematic block diagram of a computer system incorporating the present invention.

FIG. 1 is an overview of a computer system 100 incorporating the present invention, showing the relationships between the system layers for the implementation of the quiesce function. These layers are, starting from the top of FIG. 1, the application layer 102, the language subroutine and run-time library (RTL) layer 104, the operating system or kernel layer 106, and the hardware layer 108.

At the base of the system 100 is the hardware layer 108, which consists of one or more central processing units (CPUs), main memory and input/output (I/O) devices such as magnetic disk drives, magnetic tape drives, terminals, printers and the like. These components are conventional in the art and are hence not separately shown.

Kernel layer 106, the next layer above the hardware layer 108, consists of software that controls the base hardware layer, managing its CPU(s), memory and I/O devices, and contains a set of callable services (including the quiesce services to be described) that provides application code access to the resources at the hardware layer. Kernel layer 106 may comprise the IBM MVS/ESA operating system with its OpenEdition MVS extension, running on a hardware layer 108 comprising an IBM System/390 computer. However, the present invention is not limited to such a hardware/software platform, and other platforms could alternatively be used.

Language subroutine and run-time library (RTL) layer 104 is located directly above the kernel layer 106. Layer 104 consists of routines to support high-level languages (HLLs) used by many applications. Layer 104 essentially transforms the requested HLL function into the appropriate kernel service(s) to complete the request.

Application layer 102, containing one or more user applications, is the top layer of the system 100. Applications can request system services directly from the kernel layer 106 or via a HLL through the language subroutine and run-time library layer 104. For the purposes of this specification, the application layer 102 and the language subroutine and run-time library 104 may be collectively regarded as the application.

Figure 2:
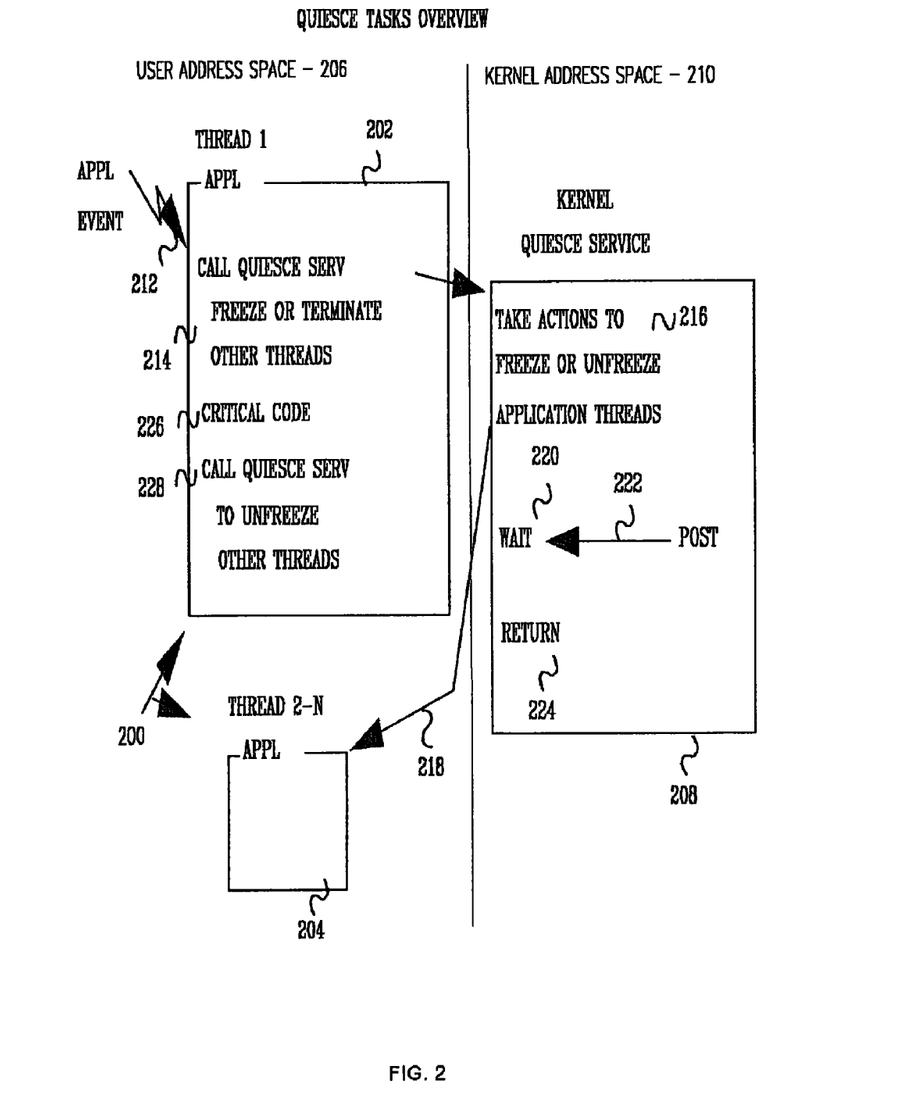
FIG. 2 shows the generic procedure for quiescing (i.e., freezing or terminating) other threads in accordance with the present invention.

FIG. 2 is a high-level flow diagram of the quiesce function of the present invention as implemented in system 100. Although the flows for specific quiesce functions (freeze, unfreeze, or terminate) are slightly more involved, all quiesces follow this general flow.

FIG. 2 shows a user application 200, from application layer 102 of system 100 (FIG. 1), comprising a first thread 202 (thread 1) and one or more additional threads 204 (threads 2 through N). Threads 202, 204 have many of the attributes of independent processes—e.g., they each have their own program counters and states (i.e., running, ready or blocked)—but differ from such independent processes in that they share a common user address space 206. (Application 200 may in fact be defined as the set of threads 202, 204 sharing the same address space.) Thread 202 is not necessarily the first thread of application 200 to be created; it is distinguished from the other threads 204 merely because it invokes the quiesce services to be described.

Also shown in FIG. 2 is the quiesce service 208 of the present invention, from kernel layer 106 of system 100. Quiesce service 208 resides in a kernel address space 210 separate from the user address space and includes the following separate services, to be described below:

1. quiesce_exit_registration (306):

Allows the initial thread to provide the address of the quiesce exit that is to receive control when a thread requests one of the quiesce functions listed below. A quiesce exit is an application-level routine that receives control as a result of a quiesce event occurring on a thread that is associated with (created by) the initial thread that registered. This exit is responsible for acting on the quiesce event delivered.

2. quiesce_freeze (404):

Sends a suspension event to all other threads, giving control to the user-defined quiesce exit. For this event, the quiesce exit determines whether any critical resources are held by the thread 204. If no critical resources are held, the quiesce exit calls the quiesce_freeze_self service. If critical resources are held, processing of the quiesce event is delayed until the critical resources have been freed.

3. quiesce_freeze_self (722):

Suspends the invoking thread. This option is used from the quiesce exit on receipt of a suspension event.

4. quiesce_event_put_back (734):

Delays the processing of a quiesce event until a later time. This option is used from the quiesce exit on receipt of a suspension event that cannot be processed due to the current execution environment.

5. quiesce_unfreeze (806):

Resumes all frozen threads.

6. quiesce_term (904):

Sends termination events to all other threads, giving control to the user-defined quiesce exit if one was specified via the quiesce_exit_registration function. For this event, the quiesce exit determines whether any critical resources are held by the thread 204. If no critical resources are held, the quiesce exit calls the pthread_exit service to terminate the thread. If critical resources are held, processing of the quiesce event is delayed until the critical resources have been freed.

7. quiesce_force:

Sends termination events to all other threads, bypassing the call to the user-defined quiesce exit.

The present invention comes into operation when an application event 212 is detected on thread 202. This application event 212 cannot be processed while other threads 204 in the application 200 are executing. Event 212 could be an abend, a program check or a break point. At this point, application 200 may want to suspend the execution of the other threads 204 so that it can take a dump or perform diagnostic functions. Alternatively, the application 200 may want to inform the other threads 204 that they need to terminate.

The present invention may be used in a debugging context, as described above. However, the present invention is not limited to such use, and the particulars of such use are not part of the present invention.

In accordance with the present invention, when thread 202 is notified of an event 212 that requires the other threads 204 in the application 200 to be quiesced, it calls (214) the kernel quiesce service 208 to quiesce the other threads in the application. The quiesce service 208 sends (216) a quiesce notification 218 to the other threads 204 and waits (i.e., suspends) (220) until the quiesce notification has been acted upon by the other threads 204. Upon receiving the quiesce notification 218, threads 204 take the appropriate action based on the quiesce type. When the last application thread 204 acts on the quiesce notification, it posts (i.e., resumes) (222) thread 202, which is waiting in the kernel quiesce service 208. Upon the delivery of the post to thread 202, the quiesce service 208 returns (224) to the application 200 on thread 202.

Thread 202 can now perform (226) any critical code which could not have been done while other threads 204 were running. When this critical code is complete and the original action was to freeze the other threads 204, thread 202 calls (228) the quiesce service 208 to unfreeze the other threads.

Figure 3:
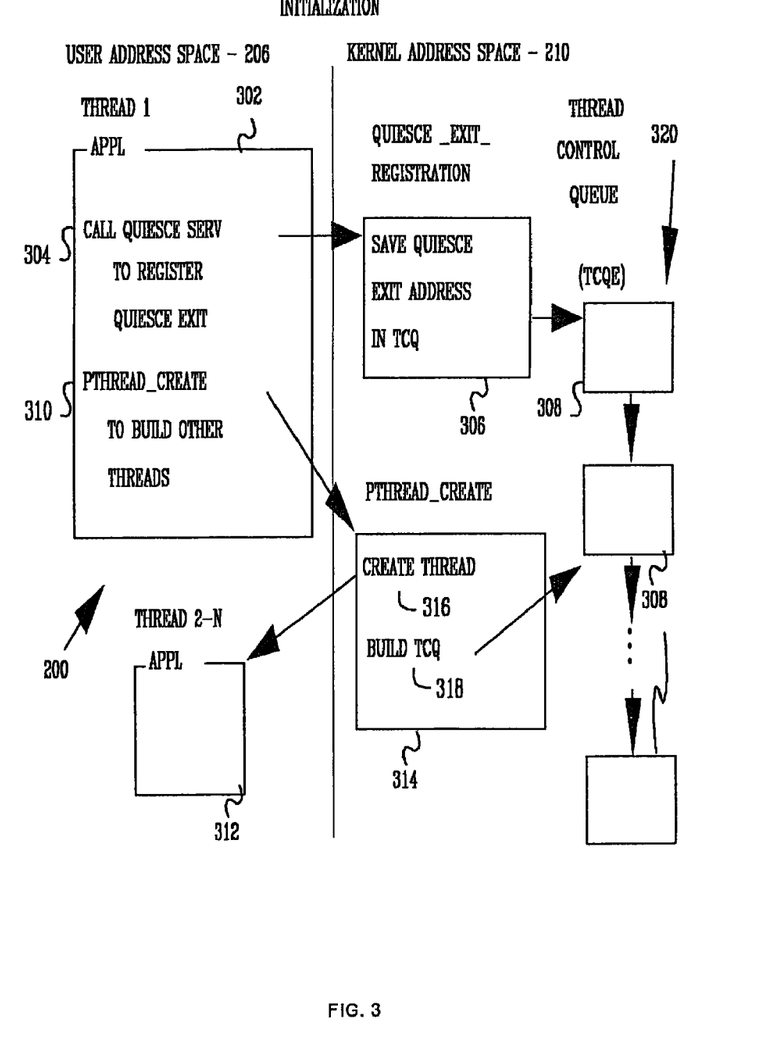
FIG. 3 shows the procedure for initially registering a quiesce exit in accordance with the present invention.

FIG. 3 shows how application 200 registers its quiesce exit, an application-defined routine (FIGS. 7-9) that handles quiesce events in a manner described further below.

Figure 6:
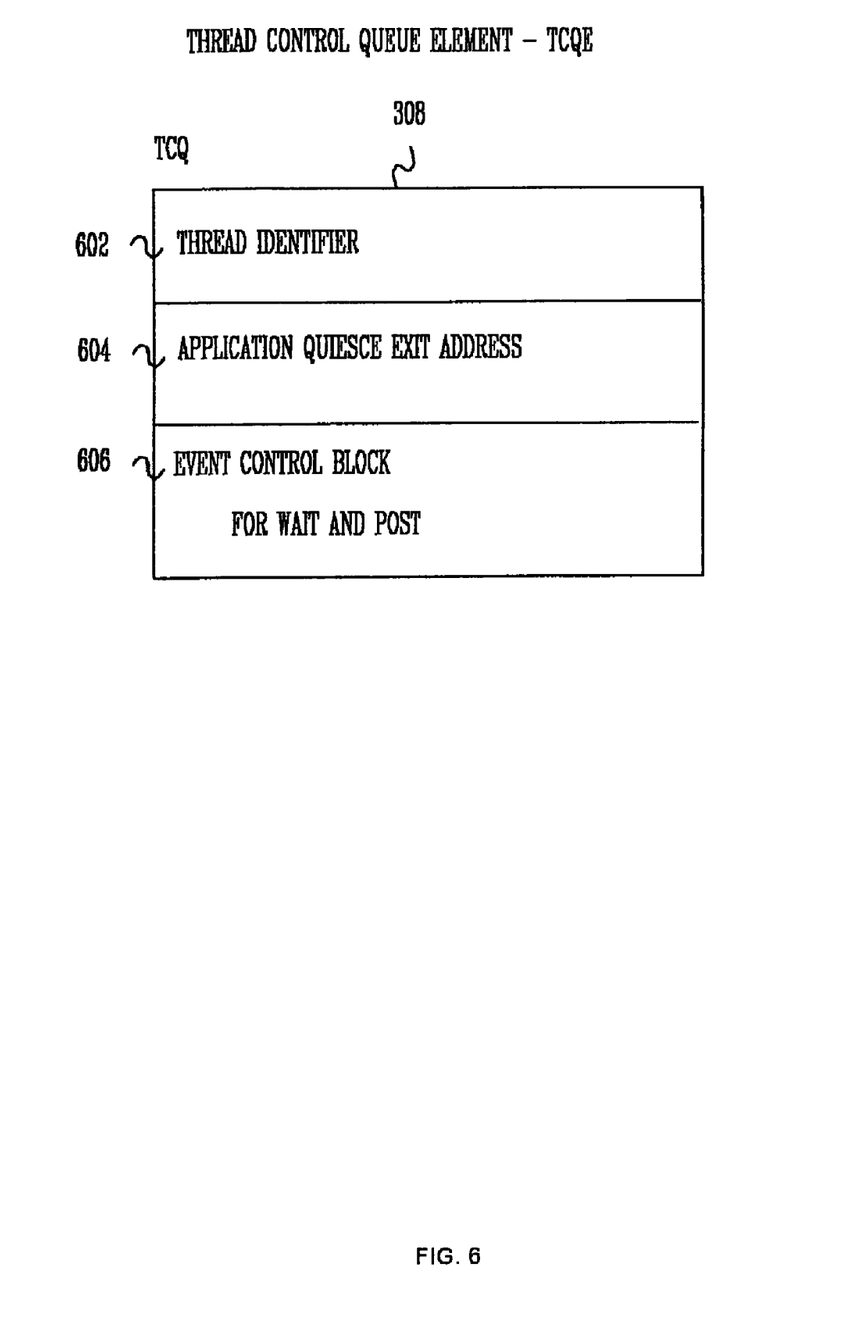
FIG. 6 shows the thread control queue element (TCQE) created during the initial registration procedure shown in FIG. 3.

To register the quiesce exit, the first thread 302 of the application 200 to be created calls (304) the quiesce_exit_registration service 306 of the quiesce service 208, passing the address (quiesce_exit) of the quiesce exit routine. Quiesce_exit_registration service 306 stores the application's quiesce exit address in a thread control queue element (TCQE) 308 for the invoking thread 302. Referring to FIG. 6, TCQE 308 is a defined area in memory that includes a thread identifier 602 identifying the thread 302, the application quiesce exit address 604, and an event control block 606 for wait and post. Thread 302 is now registered for quiesce events.

Thread 302 can now create (310) additional threads 312 using a thread creation service 314 (pthread_create) in the kernel address space. Kernel thread creation service 314 may be implemented in any suitable manner known to the art; the manner in which it is implemented is not part of the present invention. For each new thread 312 that it creates (316), the thread creation service builds (318) a TCQE 308 similar to the TCQE 308 for thread 302, assigning each new thread a unique thread identifier 602 and copying the quiesce exit address 604 from the TCQE 308 of the creating thread 302 to the TCQE 308 of the newly created thread 312. Thus all threads 302, 312 in the application are registered with the same quiesce exit address 604. As shown in FIG. 3, each TCQE 308 is linked to the TCQE for the next thread 312 by any suitable means (e.g., pointers, contiguous memory locations or the like) to form a chain, or thread control queue (TCQ) 320 as it is referred to below, so that the TCQEs 308 for a given application may be scanned sequentially as described below.

Figure 4:
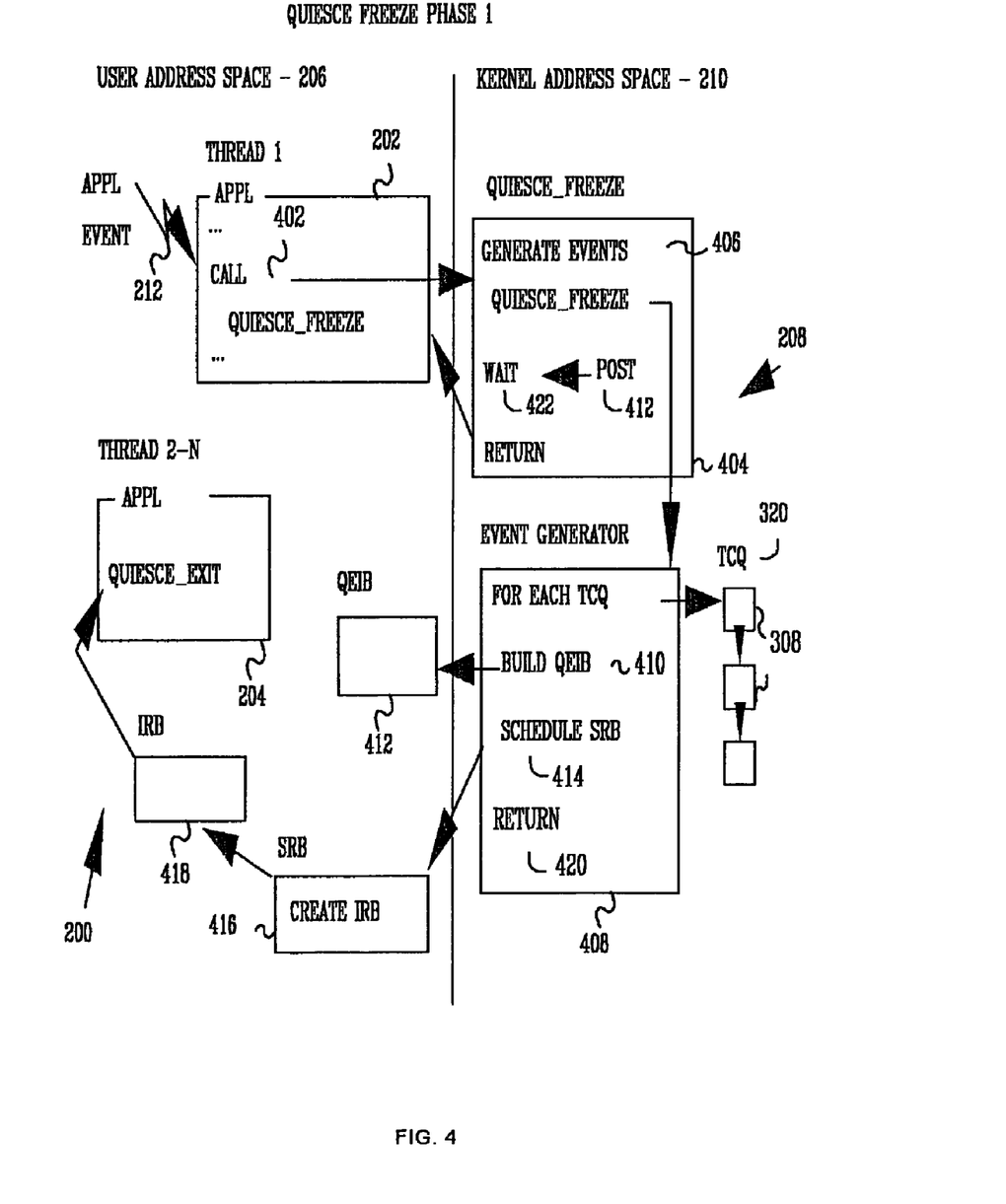
FIG. 4 shows the initial phase of the procedure for freezing (i.e., suspending) other threads in accordance with the present invention.

FIG. 4 shows in more detail the process flow shown generally in FIG. 2, beginning with the event 212 occurring on application thread 202 that requires all other threads 204 in the application 200 to be frozen.

When the application thread 202 detects event 212, it calls (402) the quiesce_freeze service 404 of the quiesce service 208. Quiesce_freeze service 404 in turn invokes (406) an internal event generator 408.

Figure 5:
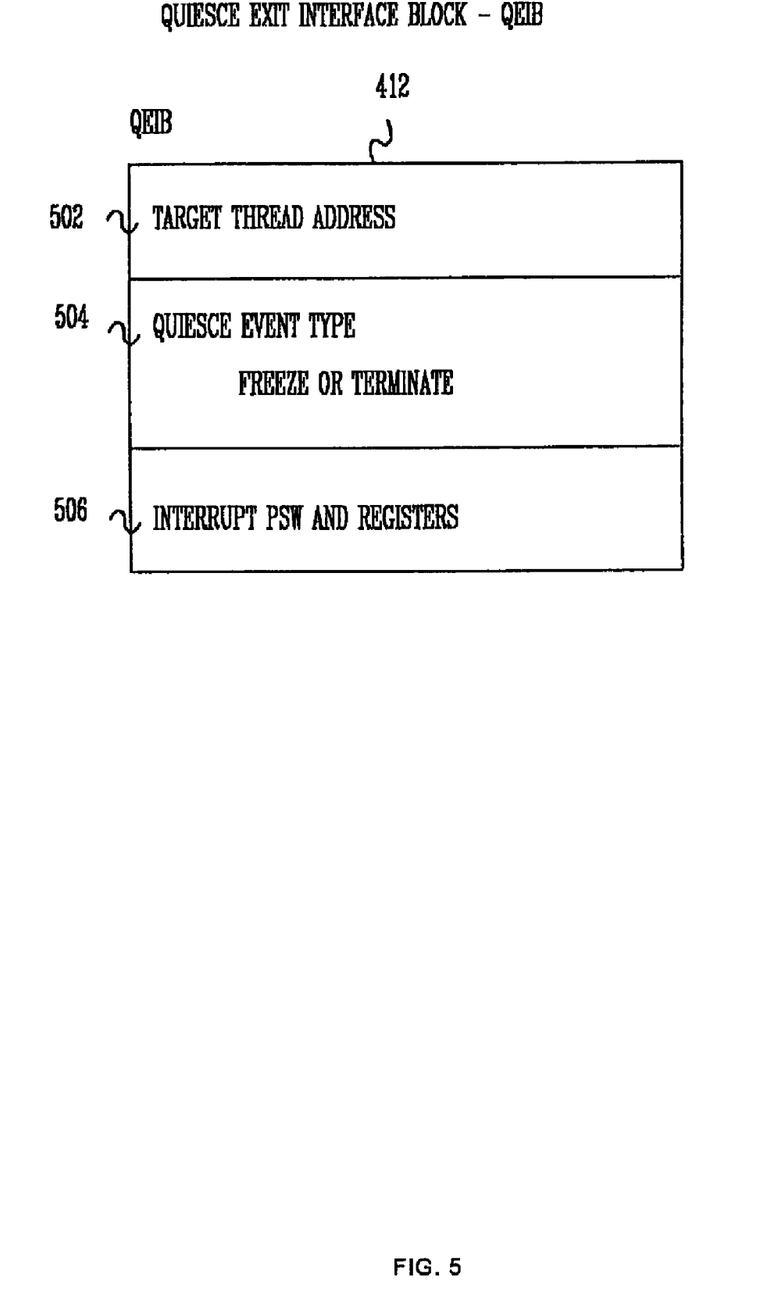
FIG. 5 shows the quiesce exit interface block (QEIB) created during the phase of the freeze procedure shown in FIG. 4.

For each thread 204 in the application 200 other than the invoking thread 202, the event generator 408 first creates (410) a quiesce exit interface block (QEIB) 412. This is accomplished by searching TCQ 320 and identifying all the prospective threads 204. Referring to FIG. 5, QEIB 412 is a defined area in user address space that includes locations for storing the address 502 of the target thread, the quiesce event type 504 (i.e., freeze or terminate), and the interrupt program status word (PSW) and register contents 506 to be described below. Event generator 408 initially fills the QEIB 412 with the target thread address 502 and the quiesce event type 504.

For each thread 204 found in TCQ 320, event generator 408 then schedules (414) a service request block (SRB) 416 to send a freeze request interrupt to the thread, to suspend it. Each SRB 416 is a unit of work that is dispatched by the kernel to execute in the user address space 206. Each SRB 416 creates and schedules an interrupt request block (IRB) 418 to the target thread 204. IRBs 418 operate in the manner described further below.

Once event generator 408 has scheduled the interrupts to all the appropriate threads 204, it returns (420) to the quiesce_freeze service 404.

Quiesce_freeze service 404 then waits (422) on the event control block 606 (FIG. 6) located in the TCQE 308 for thread 202. This wait is satisfied by a post from the last thread 204 to respond to the quiesce event, just before the last thread enters the quiesced frozen state, as described below.

Figure 7:
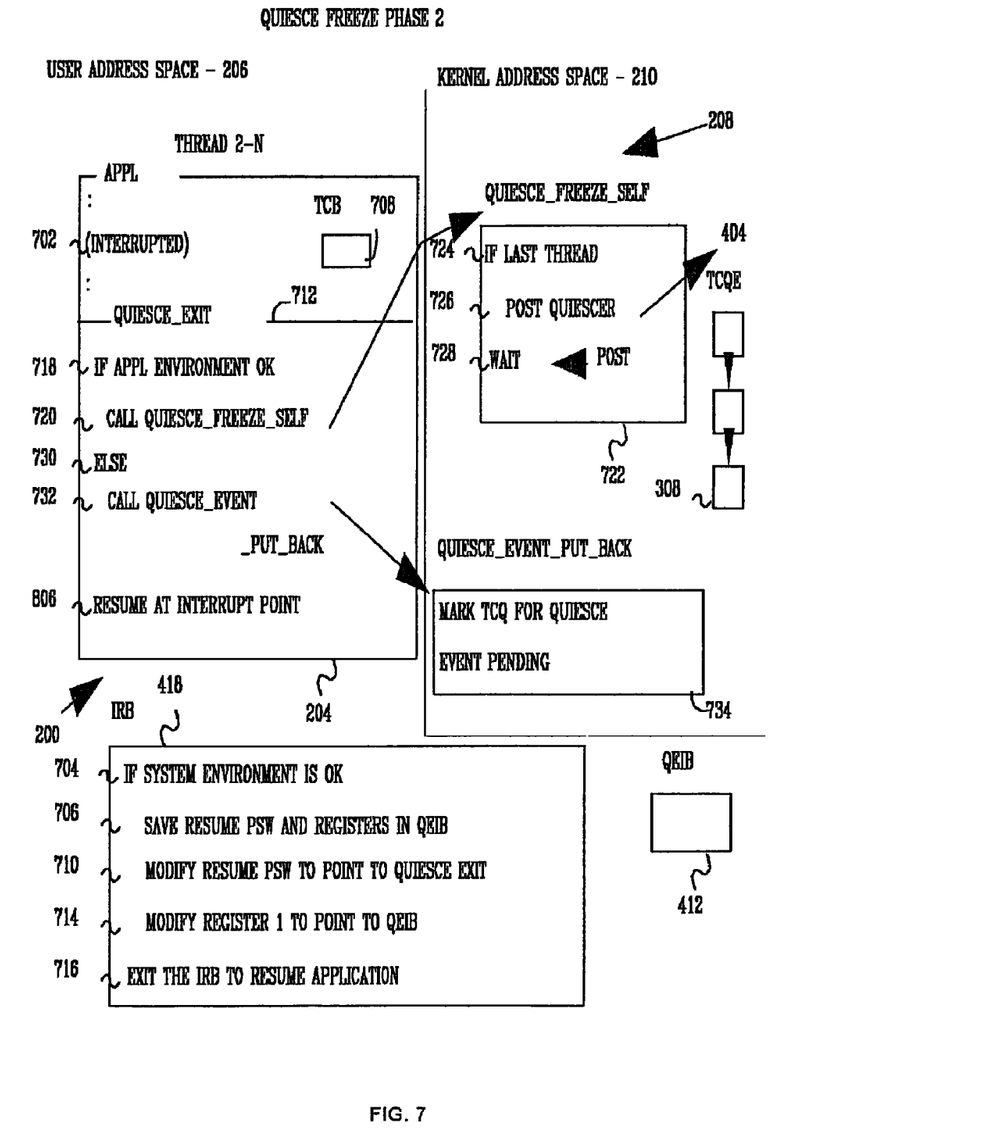
FIG. 7 shows the final phase of the procedure for freezing other threads in accordance with the present invention.

FIG. 7 describes the interrupt mechanism in more detail. Once an IRB 418 gains control in the application 200, execution halts on the targeted thread 204 at point 702. The IRE 418 then checks the application's thread status to ensure that the system environment is acceptable for handling a quiesce event. If the environment is acceptable (704), then IRB 418 saves (706) the program status word (PSW) and register contents for the thread 204 in portion 506 of the corresponding QEIB 412 (FIG. 5). The PSW and register contents for the thread 204 are extracted from a corresponding task-level control block 708 which is managed by the system dispatcher for thread 204. The PSW points to the interrupt point 702 which is to be resumed after the quiesce event is handled. IRB 418 then modifies (710) the resume PSW of the targeted thread 204 to point to the previously registered quiesce exit (712), and modifies (714) register 1 to point to the QEIB 412 of the thread 204. IRB 418 then exits (716) and execution is resumed on the target thread 204 with the modified PSW and register 1.

The quiesce exit 712 gains control and has access to the QEIB 412. The quiesce exit 712 verifies the application environment (i.e., the execution state of the thread) to make sure the thread 204 is not holding any critical resources that could deadlock the process.

If the environment is acceptable (718), the quiesce exit 712 examines the quiesce event type field 504 in QEIB 412 (FIG. 5) to determine which event type it has been called to process and, hence, whether to suspend itself or terminate. The two possible event types are an event calling for suspension of the thread 204 and an event calling for termination of the thread. If, as in this example, the event is of a type calling for suspension of the thread 204, then the quiesce exit 712 invokes (720) the quiesce_freeze_self service 722 of the quiesce service 208. Quiesce_freeze_self service 722 checks to see if the invoking thread 204 is the last thread in the application 200 to reach the quiesced state. If so (724), it posts (726) the quiesce_freeze service 404 and hence the thread 202 (FIG. 4) that originally invoked the quiesce_freeze service. The quiesce_freeze_self service 722 then suspends (728) execution of thread 204 by calling a system wait service, causing thread 204 to enter a wait.

If the quiesce exit 712 finds that the application environment is not acceptable (730), then it invokes (732) the quiesce_event_put_back service 734 to return the event back to the kernel. Quiesce_event_put_back service 734 notifies the kernel that the quiesce event cannot be handled at this time and that the application 200 will request delivery of the event at a later time. This is done by marking the event control block 606 (FIG. 6) of the appropriate TCQE 308 to indicate that the quiesce event is still pending. The burden of clearing the environment of any obstacles is on the application 200. Once the application thread 204 is ready to be quiesced, it calls the quiesce_freeze_self service 722 or, alternatively, requests the kernel to redrive the quiesce exit 712.

Figure 8:
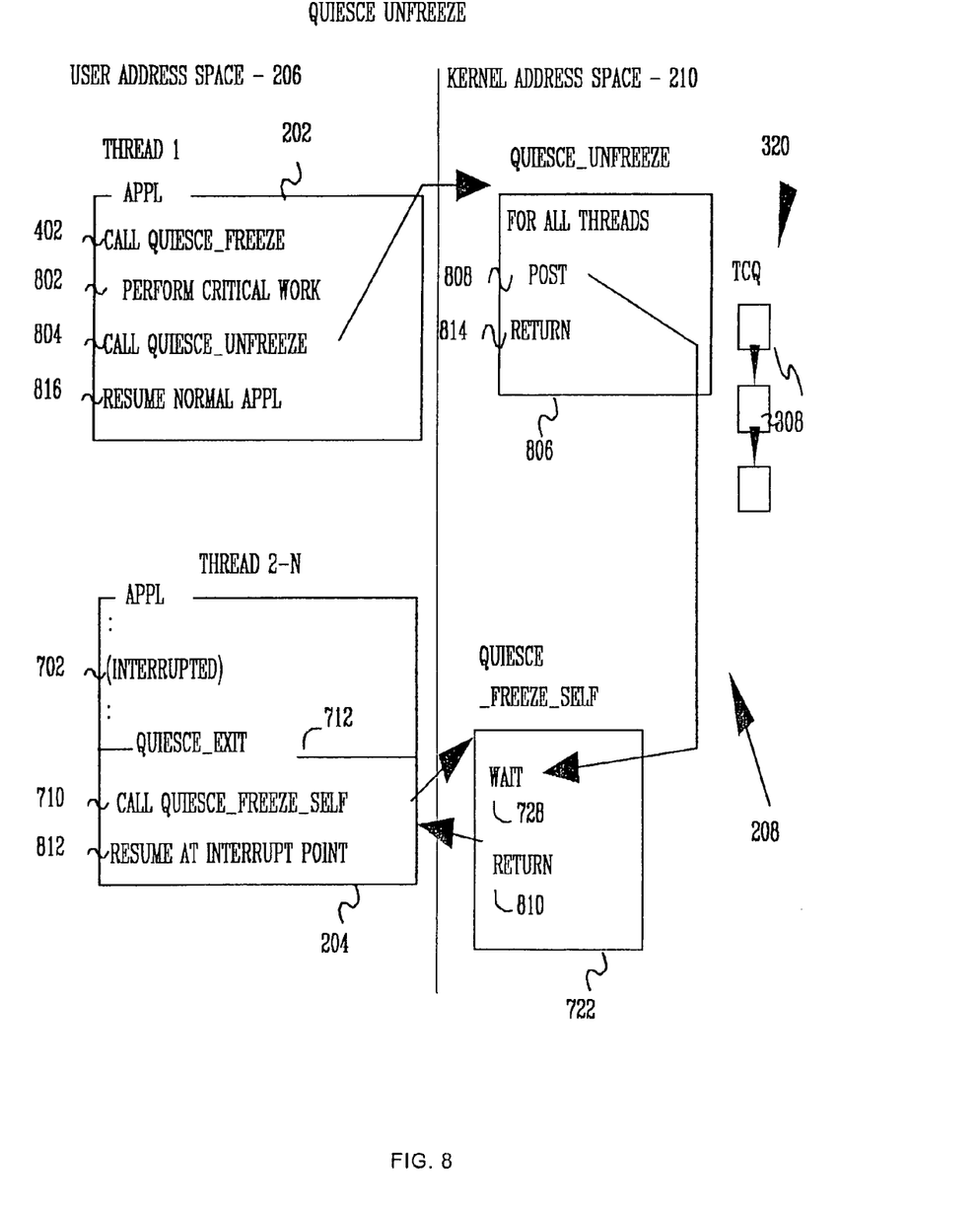
FIG. 8 shows the procedure for unfreezing (i.e., resuming) other threads in accordance with the present invention.

As noted above, when all threads 204 have invoked the quiesce_freeze_self service 722, the quiesce_freeze_self service posts (726) the quiesce_freeze service 404 (FIG. 4) and control is returned to its invoker (thread 202 of application 200). Referring now to FIG. 8, with all other threads 204 now frozen, the lone running thread 202 can now perform (802) the critical work desired without hindrance from the other threads 204 in the application 200. Upon completion of the critical work, the thread 202 calls (804) the quiesce_unfreeze service 806 of the quiesce service 208. The quiesce_unfreeze service 806 runs through the queue 320 of thread control queue elements 308 built during pthread_create (FIG. 3) and posts (808) each thread 204 that is currently waiting inside the quiesce_freeze_self service 722. Upon being posted, quiesce_freeze_self service returns (810) control of each frozen thread 204 back to the corresponding quiesce exit 712, which resumes (812) execution at the point of interruption 702; this is done by using the PSW and register contents 506 saved in the QEIB 412. The quiesce_unfreeze service 806 then returns (814) control to thread 202, which resumes (816) application processing.

Figure 9:
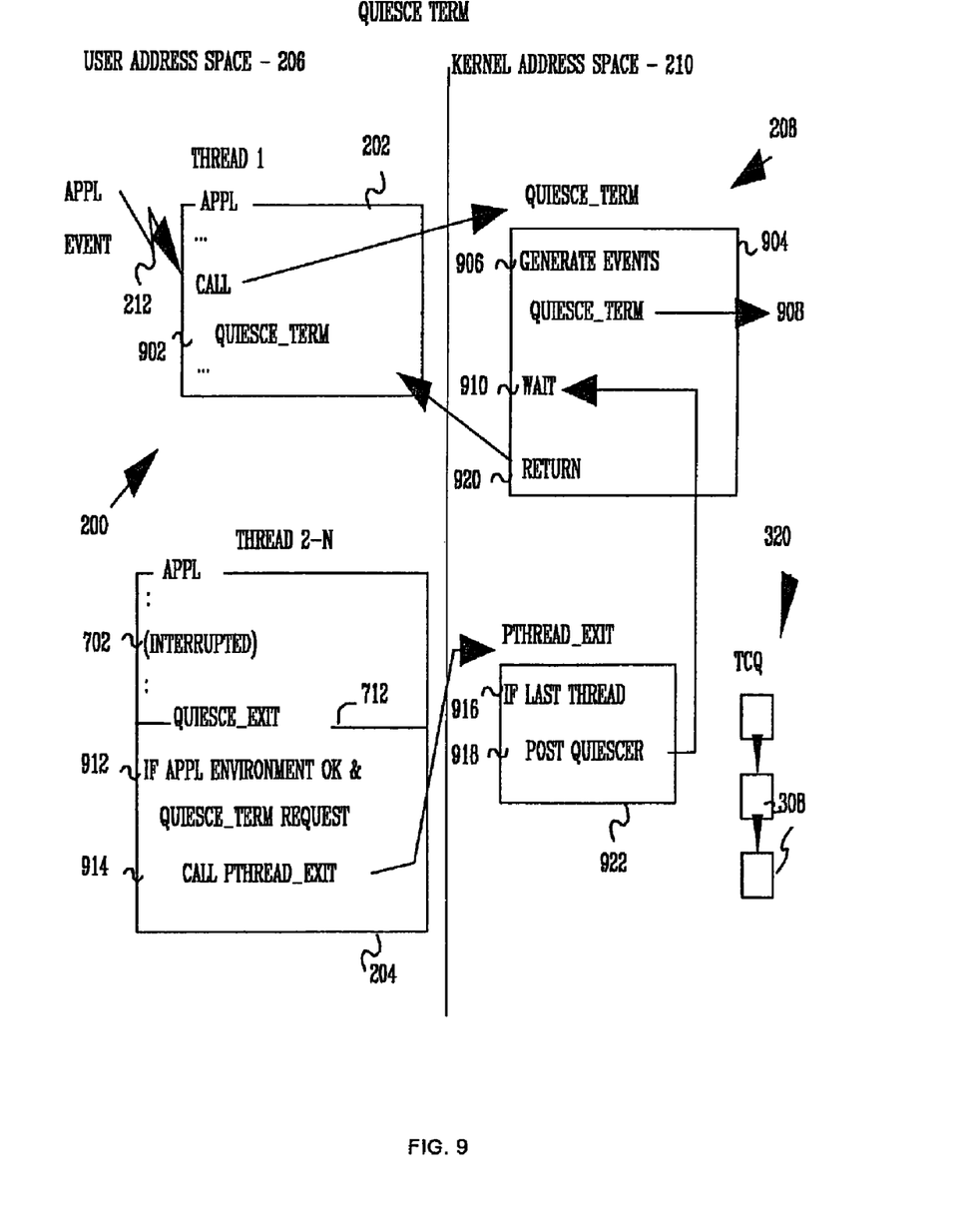
FIG. 9 shows the procedure for terminating other threads in accordance with the present invention.

FIG. 9 shows the flow of a quiesce termination request. A quiesce termination request results in the termination of all threads 204 in the application 200, with the exception of the calling thread 202. The terminating threads 204 are given an opportunity to complete application-critical code and/or clean up thread-related resources before being terminated.

As shown in FIG. 9, upon being notified of an event 212 that requires the other threads 204 in the application 200 to be terminated, thread 202 calls (902) the quiesce_term service 904 of the quiesce service 208 to request termination of the other threads in the application. The quiesce_term service 904 scans the TCQ chain 320 and generates (906) a quiesce_term event 908 for each TCQE 308 on the chain, excluding the one for the calling thread 202. Although not shown in FIG. 9, this quiesce_term event 908 is preferably delivered to threads 204 using service request blocks (SRBs) and interrupt request blocks (IRBs) similar to those shown in FIG. 4. The quiesce_term service 904 then waits (910) while the other threads 204 are terminated.

When threads 204 receive the event 908 generated by the quiesce_term service 904, the normal flow of the application is interrupted at point 702, as before, and the quiesce exit 712 is given control. The quiesce exit 712 checks the application environment, as in the suspension case (FIG. 7) described above. If the application environment is acceptable, and the generated quiesce event (as indicated by the quiesce event type field 504 in QEIB 412) is for termination (912), then the quiesce exit 712 invokes (914) the thread cleanup routine (pthread_exit) 922.

The pthread_exit routine 922 releases system resources associated with the terminating thread 204. If the terminating thread 204 is the last thread in the application that had a quiesce_term event generated to it (916), then the pthread_exit routine 922 posts (918) thread 202, which is waiting in the quiesce_term service 904. After thread 202 is posted (918) out of its wait in quiesce_term service 904, it returns (920) to the application 200 to take the appropriate action based on the event 212 received.

The quiesce_force service (not shown), operates in a manner similar to that of quiesce_term service 904, sending termination events to all other threads 204. However, the quiesce_force service bypasses the call to the user-defined quiesce exit, and the pthread_exit routine 922 is called from the interrupt request block (IRB) directly.

What is claimed is:

1. In a computer system in which a first thread and a second thread of a user application execute concurrently in a common address space, a method of processing an application event in response to the detection of said application event by said first thread, comprising the steps of:
    said first thread, in response to detecting said application event:
        sending a quiesce event to said second thread to cause said second thread to quiesce; and
        suspending execution until said second thread has quiesced in response to the quiesce event sent to said second thread; and
    said second thread, in response to receiving said quiesce event:
        determining whether it is holding any resource required by another thread;
        quiescing only if it determines that it is not holding any resource required by said another thread; and
        upon quiescing, resuming execution of said first thread to process said application event.

2. The method of claim 1 wherein said second thread is one of a plurality of additional threads executing concurrently with said first thread in said address space, said quiesce event being sent from said first thread to each of said additional threads.

3. The method of claim 2 wherein execution of said first thread is suspended until each of said additional threads has quiesced in response to the quiesce event sent to said each of said additional threads.

4. The method of claim 3 wherein the last of said additional threads to quiesce resumes execution of said first thread.

5. The method of claim 1 wherein said quiesce event is a termination event causing said second thread to terminate execution.

6. The method of claim 1 wherein said quiesce event is a suspension event causing said second thread to suspend execution.

7. The method of claim 1 wherein said step of sending a quiesce event from said first thread to said second thread comprises the step of interrupting the execution of said second thread to give control to a quiesce exit routine.

8. The method of claim 1 wherein said second thread releases any resource required by said another thread that is held by said second thread before quiescing said second thread.

9. In a computer system in which a first thread and a second thread of a user application execute concurrently in a common address space, a method of processing an application event in response to the detection of said application event by said first thread, comprising the steps of:

said first thread, in response to detecting said application event:

sending a suspension event to said second thread to cause said second thread to suspend; and suspending execution until said second thread has suspended in response to the suspension event sent to said second thread;

said second thread, in response to receiving said quiesce event:

determining whether it is holding any resource required by another thread;

quiescing only if it determines that it is not holding any resource required by said another thread; and upon quiescing resuming execution of said first thread to process said application event; and said first thread resuming said second thread following the processing of said application event by said first thread.

10. The method of claim 9 wherein a plurality of additional threads execute concurrently with said first thread in said address space, said suspension event being sent from said first thread to each of said additional threads.

11. The method of claim 10 wherein execution of said first thread is suspended until each of said additional threads has suspended in response to the suspension event sent to said each of said additional threads.

* * * * *